Oct. 17, 1967  C. L. SEEFLUTH  3,347,729
APPARATUS FOR SEALING THERMOPLASTIC MATERIALS INCLUDING
A RADIANT HEATER AND A REFLECTOR
Filed Oct. 23, 1964
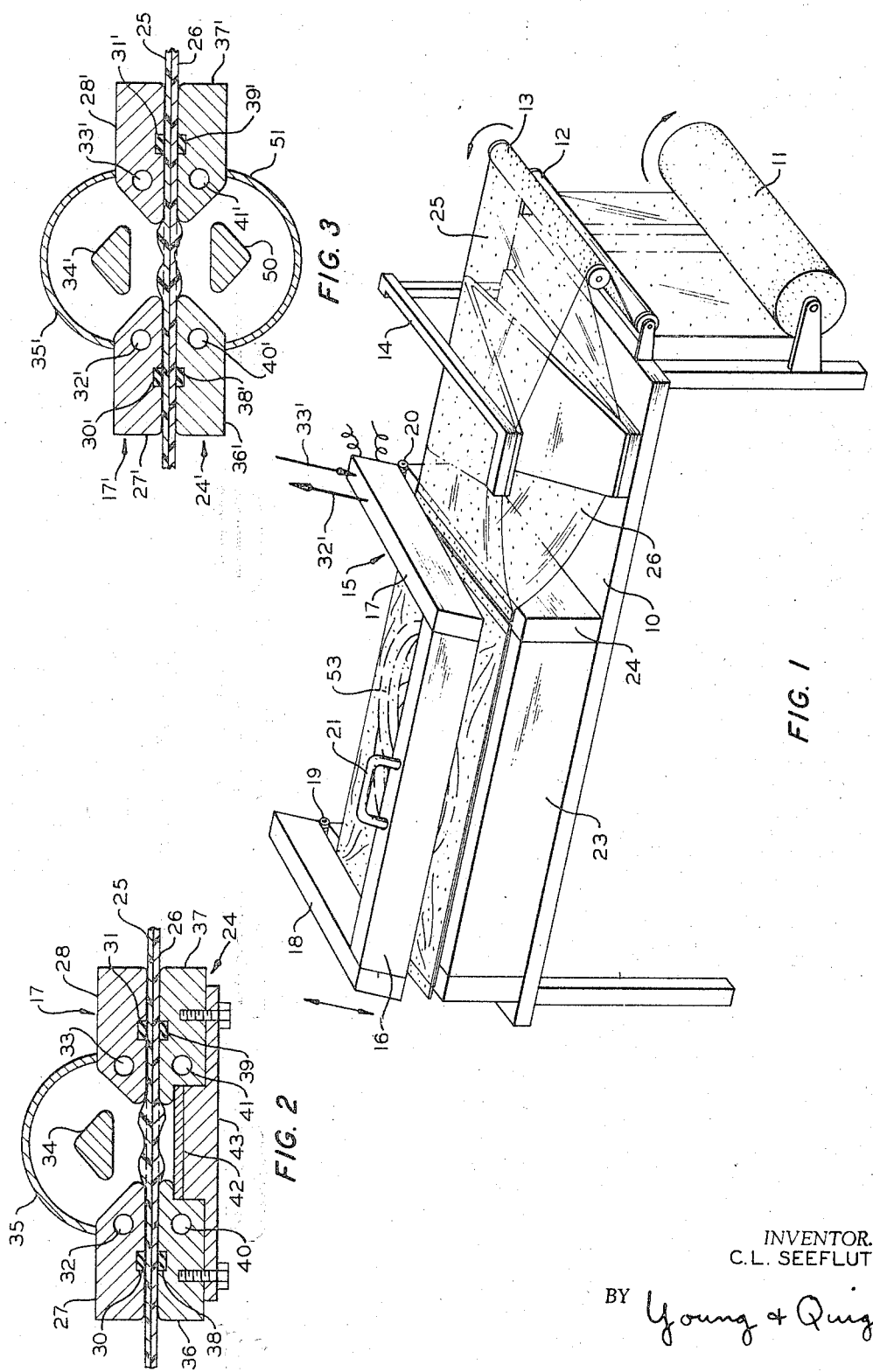
INVENTOR.
C.L. SEEFLUTH
BY Young & Quigg
ATTORNEYS

United States Patent Office 3,347,729
Patented Oct. 17, 1967

3,347,729
APPARATUS FOR SEALING THERMOPLASTIC MATERIALS INCLUDING A RADIANT HEATER AND A REFLECTOR
Charles L. Seefluth, Bartlesville, Okla., assignor to Phillips Petroleum Company, a corporation of Delaware
Filed Oct. 23, 1964, Ser. No. 406,116
3 Claims. (Cl. 156—380)

This invention relates to the sealing of thermoplastic materials.

It is common practice to increase the tensile strength of thermoplastic films by biaxially orienting the film. This can be accomplished, for example, by heating a tube of film to a temperature slightly below the melting point and then blowing the film to expand the material in all directions. Polyethylene film, for example, can be produced in this manner which has a tensile strength in the order of 28,000 pounds per square inch, whereas conventional film of the same material has a tensile strength of about 4,000 pounds per square inch. The sealing of two plies of such biaxially oriented film presents certain difficulties. When the film is heated to its melting point, there is a tendency for the film to return to its initial configuration. This results in a shrinkage in both dimensions of the plane of the film as the film thickens back to the initial dimensions prior to being blown. Such a film, when cooled, is no longer oriented and no longer possesses the higher tensile strength.

This invention provides a procedure for sealing biaxially oriented thermoplastic materials so as to provide a seal which has much greater strength than film which is not biaxially oriented. This is accomplished by establishing a temperature gradient in the materials to be sealed at the region of the seal. The center portion of the sealed region is maintained at the highest temperature, with the edge portions being at substantially lower temperatures. As the film is heated to a temperature which approaches the original orientation temperature, the film tends to thicken and shrink laterally. The region of the seal nearest the lower temperature of the gradient tends to thicken and maintain the desired strength. This procedure is particularly useful in forming seals at regions other than the edges of sheets being joined. The apparatus employed to establish the temperature gradient can be constructed so as to provide seals of various shapes. By controlling the time and temperature, it is possible to sever the sheets at the mid point of the seal to provide two separate edge seals.

Accordingly, it is an object of this invention to provide an improved method of sealing thermoplastic materials.

Another object is to provide a procedure for sealing biaxially oriented films so as to maintain a joint which has substantially the same strength as the initial films.

A further object is to provide novel apparatus for use in sealing thermoplastic materials.

Other objects, advantages and features of the invention should become apparent from the following detailed description, taken in conjunction with the accompanying drawing in which:

FIGURE 1 is a schematic representation of film packaging equipment which employs the sealing apparatus of this invention.

FIGURE 2 is a sectional view of a first embodiment of the sealing apparatus of this invention.

FIGURE 3 is a sectional view of a second embodiment of the sealing apparatus of this invention.

Referring now to the drawing in detail and to FIGURE 1 in particular, there is shown apparatus which can be employed to package articles in thermoplastic film. This apparatus is supported on a table 10 at a convenient height to be manipulated by an operator. A folded sheet of film formed by sides 25 and 26 is mounted on a supply roll 11. The film extends from roll 11 about guide rolls 12 and 13 to a spreader frame 14. The film is folded at the rear so that a pocket is provided when the film extends through guide 14. An operator standing in front of the table inserts the object to be packaged into this open pocket. The film and object to be packaged are then transported to the left to a sealing assembly 15.

Sealing assembly 15 is provided with two upper sealing bars 16 and 17 which are joined to form an L-shaped sealing element. A support bar 18 extends from bar 16 to a hinge 19 at the rear of the table. Bar 17 is secured to the rear of the table by a hinge 20. Bar 16 is provided with a handle 21 so that heating bars 17 and 16 can be lifted to permit the film to be moved into the heating assembly. Lower heating bars 23 and 24 are positioned beneath respective bars 16 and 17 so that an L-shaped seal is formed when the heating assembly is closed with film therebetween. It should thus be evident that the L-shaped sealing assembly seals the two plies of film so that the object 53 to be packaged is completely enclosed.

The heating apparatus of this invention is particularly useful for forming heating bars 17 and 24. The apparatus can also be used to form heating bars 16 and 23, although conventional edged sealing elements can be employed for this purpose if desired.

A cross-sectional view of the interior assembly of heating bars 17 and 24 is shown in FIGURE 2. Heating bar 17 is formed of two metal film gripping jaws 27 and 28 which are separated from one another. Jaws 27 and 28 are provided with respective inserts 30 and 31 of a resilient material which grips film 25. Jaws 27 and 28 are also provided with respective passages 32 and 33 through which a coolant is circulated. Water can conveniently be employed for this purpose. A radiant heating element 34 is suspended above film 25 between jaws 27 and 28. A radiation reflector 35 can be positioned above heating element 34 to reflect any radiation which may be emitted upwardly down through films 25 and 26.

Additional jaws 36 and 37 are positioned beneath respective jaws 27 and 28 so as to form means to retain the films in the sealing position. Jaws 36 and 37 are provided with respective gripping inserts 38 and 39 with respective coolant passages 40 and 41. A radiation reflecting plate 42 extends between jaws 36 and 37 and is retained in place by a backing plate 43. Any radiation from heating bar 34 which passes downwardly through films 25 and 26 is reflected back through the films by plate 42 to increase the amount of heat imparted to the films.

It should be evident from an inspection of FIGURE 2 that a temperature gradient is established in the films being sealed. The central region between the jaws is at the highest temperature, whereas the regions adjacent the gripping jaws are at the lowest temperatures. This temperature gradient results in part from the coolant being circulated through passages 32, 33, 40 and 41. Although not illustrated in FIGURE 2, the heating assembly can be provided with a cover, which cover can be insulated to protect the operator. As illustrated in FIGURE 2, the films tend to shrink at the region of higher temperature and thicken adjacent the jaws. This provides a thickened sealing bead which provides a strength that approximates the strength of the original biaxially oriented film. By controlling the temperature of the heating bar and/or the duration of application of heat, it is possible to provide a seal which remains intact, as illustrated, or which is formed of two beads severed from one another. In some applications of the packaging apparatus of FIGURE 1, it may be desirable to provide individual packages for each item. In other applications, it may be desirable to have the individual packages secured to one another to facilitate handling. Either configuration can readily be accomplished by controlling the temperature and duration of the applied heat.

The amount of heat supplied for any given sealing operation will be a function of the melting temperature and the thickness of the film employed, as well as the nature of the seal desired. In general, it has been found that good seals between polyethylene sheets can be obtained when the heat source is at a temperature in the range of 800 to 2,000° F. and is spaced from the film about one-eighth to one inch. The clamping jaws should be retained at temperatures below about 200° F., although lower temperatures are desirable. Under these conditions, a sealing time of one to two seconds is adequate to seal films of about one-half to eight mils in thickness.

A second embodiment of the heating apparatus of this invention is illustrated in FIGURE 3. This embodiment is quite similar to the apparatus of FIGURE 2 and corresponding elements are designated by like primed reference numerals. The only difference between the heaters of FIGURE 2 and FIGURE 3 is that the heater of FIGURE 3 is provided with a second heating element 50 and reflector 51 beneath the films to be sealed. This provides an increased amount of heat and can shorten the sealing cycle.

As previously mentioned, the heating element of this invention can be constructed of any desired configuration. For example, a circular heater can be employed to seal objects between two sheets of film. A heater of this configuration is quite useful when it is desired to package a large number of individual items between two sheets of film.

While the invention has been described in conjunction with presently preferred embodiments, it should be evident that it is not limited thereto.

What is claimed is:
1. Apparatus for sealing thermoplastic materials which are at least partially transparent to radiant heat, comprising first and second retaining means spaced from one another and adapted to engage materials to be bonded so that such materials extend between said retaining means, a radiant heater positioned between said retaining means at a location on one side of the materials to be bonded when such materials extend between said retaining means so that radiant heat is directed into such materials, a radiation reflector positioned between said retaining means at a location on the opposite side of the materials to be bonded when such materials extend between radiation means so that radiation transmitted from said heater through the material extending between said radiation means strikes said reflector and is reflected back into the material, and means to cool said retaining means.

2. The apparatus of claim 1 wherein each of said retaining means comprises a pair of jaws adapted to be moved together to engage the materials to be bonded.

3. The apparatus of claim 2 wherein said means to cool comprises means forming passages through each of said jaws to permit flow of coolant therethrough.

References Cited
UNITED STATES PATENTS

| 2,606,850 | 8/1952 | Piazze | 156—499 |
| 3,243,330 | 3/1966 | Zelnick | 156—380 |

EARL M. BERGERT, *Primary Examiner.*

DOUGLAS J. DRUMMOND, *Examiner.*